(12) United States Patent
Bailey et al.

(10) Patent No.: US 12,671,562 B2
(45) Date of Patent: Jun. 30, 2026

(54) SYSTEMS AND METHODS FOR ALLOCATING BANDWIDTH BETWEEN A PAIR OF COUPLED BANDWIDTH RESOURCES

(71) Applicant: T-Mobile USA, Inc., Bellevue, WA (US)

(72) Inventors: Christopher Bailey, Overland Park, KS (US); Ryan P. Dreiling, Shawnee, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 304 days.

(21) Appl. No.: 18/595,983

(22) Filed: Mar. 5, 2024

(65) Prior Publication Data

US 2025/0286692 A1 Sep. 11, 2025

(51) Int. Cl.
| | |
|---|---|
| *H04L 5/14* | (2006.01) |
| *H04L 5/00* | (2006.01) |
| *H04W 72/0453* | (2023.01) |
| *H04W 72/563* | (2023.01) |

(52) U.S. Cl.
CPC .............. *H04L 5/14* (2013.01); *H04L 5/0087* (2013.01); *H04W 72/0453* (2013.01); *H04W 72/563* (2023.01)

(58) Field of Classification Search
None
See application file for complete search history.

(56) References Cited

U.S. PATENT DOCUMENTS

| | | |
|---|---|---|
| 6,016,311 A | 1/2000 | Gilbert et al. |
| 6,925,068 B1 | 8/2005 | Stanwood et al. |
| 7,486,639 B2 | 2/2009 | Stanwood et al. |
| 7,961,618 B1 | 6/2011 | Prasad et al. |
| 8,320,267 B2 | 11/2012 | Wei et al. |
| 8,325,670 B2 | 12/2012 | Afrashteh et al. |
| 8,965,429 B2 | 2/2015 | Forster et al. |

(Continued)

FOREIGN PATENT DOCUMENTS

| | | |
|---|---|---|
| CN | 102177758 B | 9/2014 |
| CN | 103037376 B | 8/2016 |

(Continued)

*Primary Examiner* — Kouroush Mohebbi
(74) *Attorney, Agent, or Firm* — Perkins Coie LLP

(57) ABSTRACT

The system establishes a connection to a wireless device on a cellular network. The system allocates bandwidth between a pair of coupled bandwidth resources for the wireless device. The system determines, based on usage of at least the wireless device and at least one key performance indicator (KPI), cellular network usage for a geographic area. The system calculates a usage trend over a predetermined time period. The system adjusts the allocation of bandwidth of the first bandwidth resource for the wireless device based on the usage trend. The first bandwidth resource is prioritized over the second bandwidth resource by reducing an amount of bandwidth allocated to the second bandwidth resource and proportionally increasing an amount of bandwidth allocated to the first bandwidth resource. The system readjusts the allocation of bandwidth of the first bandwidth resource for the wireless device based on an update to the usage trend.

20 Claims, 7 Drawing Sheets

(56) References Cited

U.S. PATENT DOCUMENTS

| | | | |
|---|---|---|---|
| 9,565,655 | B2 | 2/2017 | Love et al. |
| 9,591,639 | B2 | 3/2017 | Zimmerman et al. |
| 10,039,098 | B2 | 7/2018 | Chincholi et al. |
| 10,595,319 | B2 | 3/2020 | Tabet et al. |
| 10,608,805 | B2 | 3/2020 | Novlan et al. |
| 10,813,100 | B2 * | 10/2020 | Chen ..................... H04W 72/04 |
| 10,966,211 | B2 | 3/2021 | Kim et al. |
| 11,012,112 | B2 | 5/2021 | Liu et al. |
| 11,071,162 | B2 | 7/2021 | Patel et al. |
| 11,139,931 | B2 | 10/2021 | Wei et al. |
| 11,723,028 | B2 | 8/2023 | Ibrahim et al. |
| 11,770,234 | B2 | 9/2023 | Abdelghaffar et al. |
| 11,832,284 | B2 | 11/2023 | Abotabl et al. |
| 11,870,734 | B2 | 1/2024 | Abotabl et al. |
| 12,273,770 | B2 * | 4/2025 | Mueller ................ H04W 72/23 |
| 2008/0176523 | A1 | 7/2008 | Sutton et al. |
| 2009/0323602 | A1 | 12/2009 | Li et al. |
| 2011/0136495 | A1 | 6/2011 | Chen et al. |
| 2012/0140802 | A1 | 6/2012 | Sutton |
| 2013/0188536 | A1 | 7/2013 | Pirskanen et al. |
| 2015/0372871 | A1 | 12/2015 | Zang |
| 2017/0135105 | A1 | 5/2017 | Li et al. |
| 2017/0251467 | A1 | 8/2017 | Dame |
| 2019/0342874 | A1 | 11/2019 | Davydov et al. |
| 2021/0167938 | A1 | 6/2021 | Yu et al. |
| 2021/0321387 | A1 | 10/2021 | Duan et al. |
| 2021/0377939 | A1 | 12/2021 | Chae et al. |
| 2022/0247468 | A1 | 8/2022 | Huang et al. |
| 2023/0074086 | A1 | 3/2023 | Yi et al. |
| 2023/0118475 | A1 | 4/2023 | Abotabl et al. |
| 2023/0164576 | A1 | 5/2023 | Ponugoti et al. |
| 2023/0239841 | A1 | 7/2023 | Zhou et al. |

FOREIGN PATENT DOCUMENTS

| | | |
|---|---|---|
| CN | 112673655 B | 8/2022 |
| DE | 102015118116 A1 | 6/2016 |
| EP | 2239989 B1 | 1/2015 |
| EP | 1869929 B1 | 11/2015 |
| EP | 3026973 A1 | 6/2016 |
| EP | 3142283 A1 | 3/2017 |
| JP | 2001523931 A | 11/2001 |
| JP | 2020502867 A | 1/2020 |
| JP | 7091371 B2 | 6/2022 |
| KR | 101149668 B1 | 5/2012 |
| KR | 102221457 B1 | 3/2021 |
| KR | 102587135 B1 | 10/2023 |
| WO | 9926430 A1 | 5/1999 |
| WO | 2007127009 A2 | 11/2007 |
| WO | 2010012178 A1 | 2/2010 |
| WO | 2018224042 A1 | 12/2018 |
| WO | 2021133678 A1 | 7/2021 |
| WO | 2021203124 A1 | 10/2021 |
| WO | 2021226506 A1 | 11/2021 |
| WO | 2021231522 A1 | 11/2021 |
| WO | 2021243287 A1 | 12/2021 |

* cited by examiner

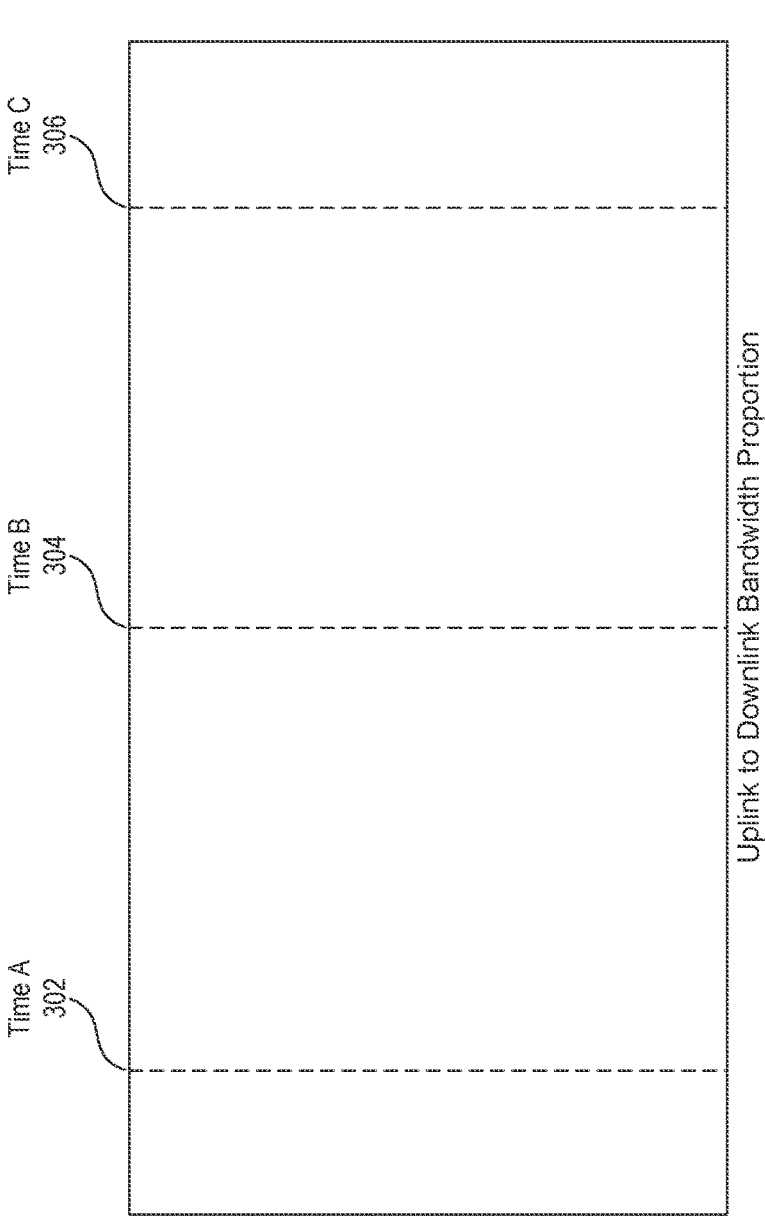
*FIG. 3*

500

Table 5.3.6-1: FDD asymmetric UL and DL channel bandwidth combinations

| NR Band | Channel bandwidths for UL (MHz) | Channel bandwidths for DL (MHz) | Asymmetric channel bandwidth combination set |
|---|---|---|---|
| n5 | 20 | 25 | 0 |
| n8 | 20 | 35 | 0 |
| n24 | 10 | 5 | 0 |
| n25 | 40 | 45 | 0 |
| n66 | 5, 10 | 20, 40 | 0 |
|  | 20 | 40 |  |
|  | 5, 10 | 20, 25, 30, 40 | 1 |
|  | 20, 25, 30 | 40 |  |
| n70 | 5, 10 | 15 | 0 |
|  | 5, 10, 15 | 20, 25 |  |
| n71 | 5 | 10 | 0 |
|  | 10 | 15 |  |
|  | 15 | 20 |  |
|  | 5 | 10 | 1 |
|  | 10 | 15 |  |
|  | 15 | 20 |  |
|  | 20 | 35 |  |
|  | 20 | 25, 30, 35 | 2 |
| n91[1] | 10 | 5 | 0 |
| n92[1] | 5 | 10, 15, 20 | 0 |
|  | 10 | 15, 20 |  |
| n93[1] | 10 | 5 | 0 |
| n94[1] | 5 | 10, 15, 20 | 0 |
|  | 10 | 15, 20 |  |
| NOTE 1: | The assignment of the paired UL and DL channels are subject to a TX-RX separation as specified in clause 5.4.4. | | |
| NOTE 2: | As indicated in TS38.306 [15], it is mandatory for UEs to support asymmetric channel BCS0 if there is an asymmetric BCS0 defined for the band. | | |

*FIG. 5*

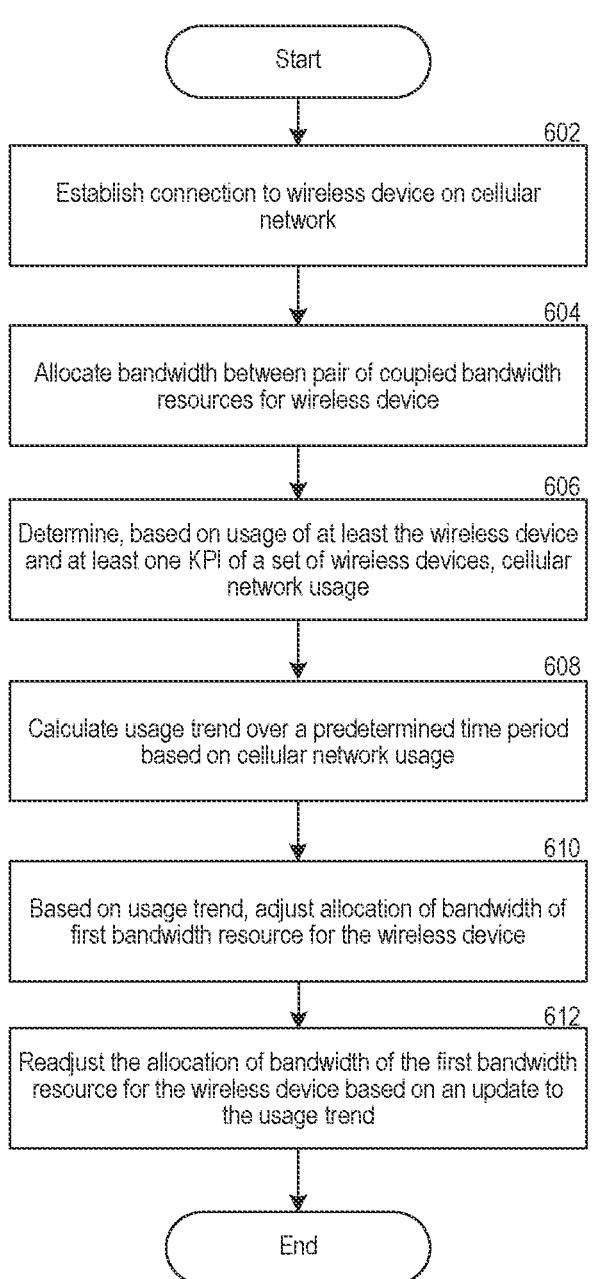

600

Start

602

Establish connection to wireless device on cellular network

604

Allocate bandwidth between pair of coupled bandwidth resources for wireless device

606

Determine, based on usage of at least the wireless device and at least one KPI of a set of wireless devices, cellular network usage

608

Calculate usage trend over a predetermined time period based on cellular network usage

610

Based on usage trend, adjust allocation of bandwidth of first bandwidth resource for the wireless device

612

Readjust the allocation of bandwidth of the first bandwidth resource for the wireless device based on an update to the usage trend End

*FIG. 6*

SYSTEMS AND METHODS FOR ALLOCATING BANDWIDTH BETWEEN A PAIR OF COUPLED BANDWIDTH RESOURCES

BACKGROUND

A duplex communication system is a point-to-point system composed of two or more connected parties or devices that can communicate in both directions. Duplex systems are employed in many communications networks, either to allow for simultaneous communication in both directions between two connected parties or to provide a reverse path for the monitoring and remote adjustment of equipment in the field. Time division duplex (TDD) refers to duplex communication links where the uplink is separated from the downlink by allocating different time slots in the same frequency band. It is a transmission scheme that allows asymmetric flow for uplink and downlink data transmission. Users are allocated time slots for uplink and downlink transmission. Frequency division duplexing (FDD) is a method for establishing a full-duplex communications link that uses two different radio frequencies for transmitter and receiver operation. FDD operation normally assigns transmitter and receiver to different communication channels. One frequency is used to communicate in one direction, and the other frequency is required to communicate in the opposite direction.

BRIEF DESCRIPTION OF THE DRAWINGS

Detailed descriptions of implementations of the present invention will be described and explained through the use of the accompanying drawings.

FIG. 3 is a block diagram that illustrates the proportion of bandwidth allocated between a pair of coupled bandwidth resources.

FIG. 5 is a table that illustrates the asymmetric uplink and downlink bandwidth combinations.

FIG. 6 is a flowchart that illustrates a process 600 for dynamically adjusting the allocation of bandwidth between a pair of coupled bandwidth resources.

Figure 1:
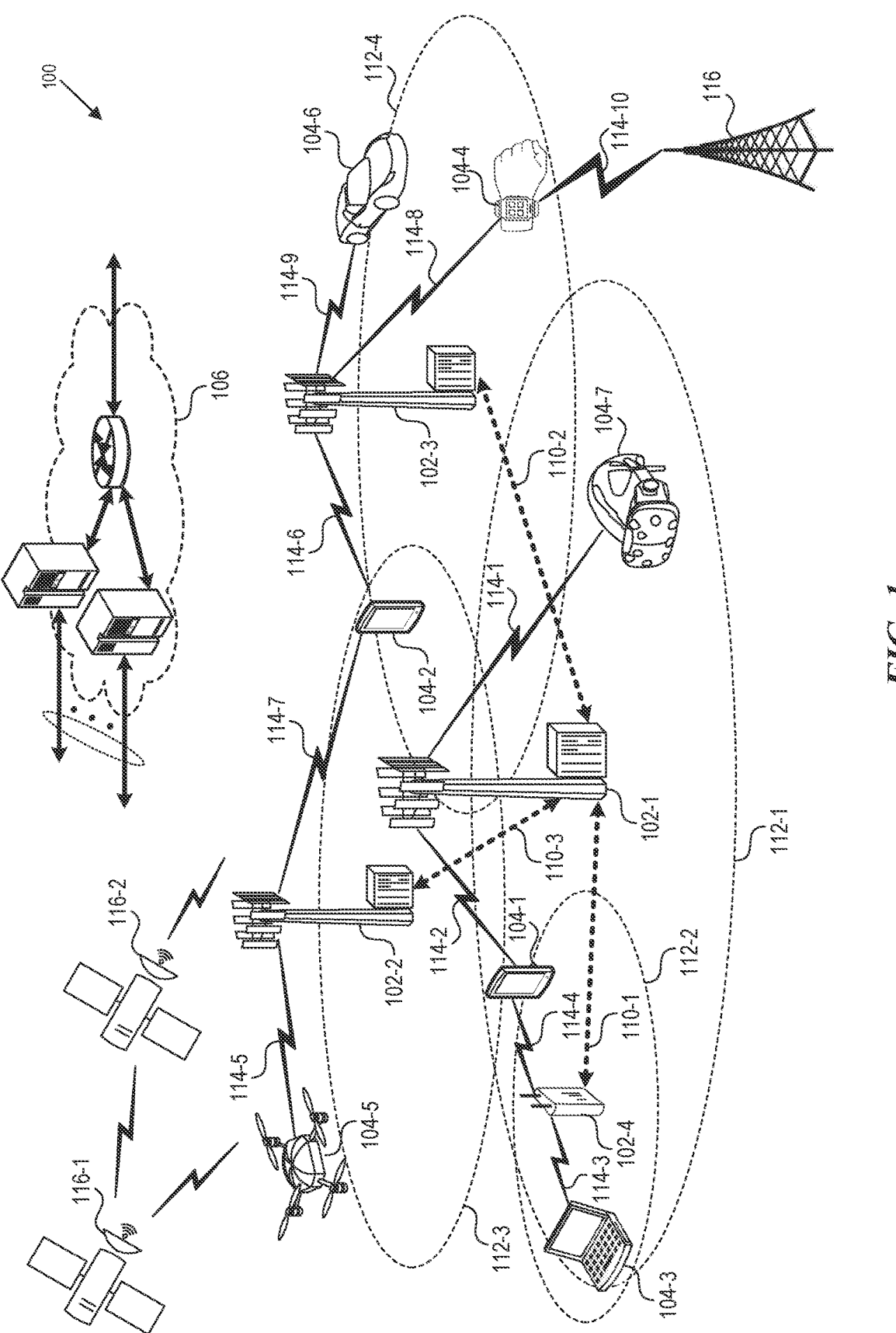
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to the dynamic allocation of bandwidth between a pair of coupled bandwidth resources for private 5G new radio (NR) networks, which can have a fixed amount of spectrum bandwidth allocated for the network. Coupled bandwidth resources such as uplink and downlink bandwidth are bandwidth resources that are inversely related, meaning the amount of bandwidth allocated is adjusted relative to the other. In addition, the disclosed technology can accommodate initial 5G NR launches that depend on allocating bandwidth between existing long-term evolution (LTE) and 5G in non-stand-alone (NSA) mode (5G NR radio with LTE core). When in NSA mode, the allocation between 5G uplink bandwidth and downlink bandwidth allows for an increase or decrease to the amount of bandwidth allocated to the LTE. In one example, the technology is contained in a next-generation node b (gNB) or a secondary unit connected to the gNB, such as a private NR module.

Coupled bandwidth resources such as uplink or downlink bandwidth can be duplexed or allocated as either time division duplexing (TDD) or frequency division duplexing (FDD), with both having a predetermined fixed amount of allocatable bandwidth. TDD is a communication method where the pair of coupled bandwidth resources use the same frequency band but transmit and receive network traffic at different times. TDD has a fixed total number of slots with a fixed size and time duration that can be assigned to the pair of coupled bandwidth resources, such as uplink or downlink slots. Therefore, TDD allocates bandwidth by adjusting the number of slots assigned to each bandwidth resource. FDD is a full-duplex method with two different frequencies to transmit and receive operations. Therefore, the bandwidth resources are transmitted on different frequencies.

Due to the network's fixed amount of allocatable bandwidth, the technology prioritizes one bandwidth resource from the pair of coupled bandwidth resources over the other. For example, the technology can increase the amount of uplink bandwidth by lowering the downlink bandwidth by the same amount. The disclosed technology determines the ratio for which to allocate each bandwidth resource by generating a usage trend related to the network utilization.

The technology can generate the usage trend by determining usage patterns of a wireless device connected to the network and by analyzing key performance indicators (KPIs). For example, KPIs can include block error codes, random access channel (RACH) failures, dropped call rate (DCR), physical downlink shared channel (PDSCH) throughput, physical uplink shared channel (PUSCH) throughput, uplink modulation and coding scheme (MCS), downlink MCS, average channel quality information (CQI), and LTE and 5G usage. The usage trend can correspond to the network utilization patterns for a predetermined time period. The disclosed technology can analyze the usage trend over the time period to determine the frequency for which the allocation of bandwidth resources is adjusted. For example, the time period can be hourly, daily, weekly, or monthly.

Analyzing the usage trend can allow the technology to reallocate bandwidth resources better to accommodate the network utilization over the given time period. For example, the bandwidth proportion for the pair of coupled bandwidth resources can be 20/80, 40/60, 70/30, or 90/10. In another example, the technology can allocate the bandwidth between the pair of coupled bandwidth resources by altering the TDD slot configurations based on the network utilization and the usage trend.

For example, when the usage trend indicates additional downlink bandwidth is required in the morning and more uplink bandwidth is required in the evening, the technology can in the morning configure a greater number of TDD slots for uplink bandwidth by reducing the number of TDD slots for downlink bandwidth by the number of TDD slots the uplink bandwidth was increased. In the evening, the technology can configure a greater number of TDD slots for downlink bandwidth by reducing the number of TDD slots for uplink bandwidth.

The technology can allocate bandwidth for 5G and LTE in a similar manner by, for example, prioritizing 5G by allocating more bandwidth to 5G uplink and downlink by reducing the bandwidth for LTE at a given time of day to correspond with the usage trend and network utilization. For example, asymmetric 5G bandwidth combinations can have additional unused bandwidth spectrum. Unused bandwidth spectrum can be allocated to LTE if the system deems that additional LTE bandwidth is desired. This can be applied when in NSA mode. The technology can dynamically adjust the ratio of the pair of coupled bandwidth resources given changes in the usage trend and network utilization by prioritizing one bandwidth resource over the other coupled bandwidth resource.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
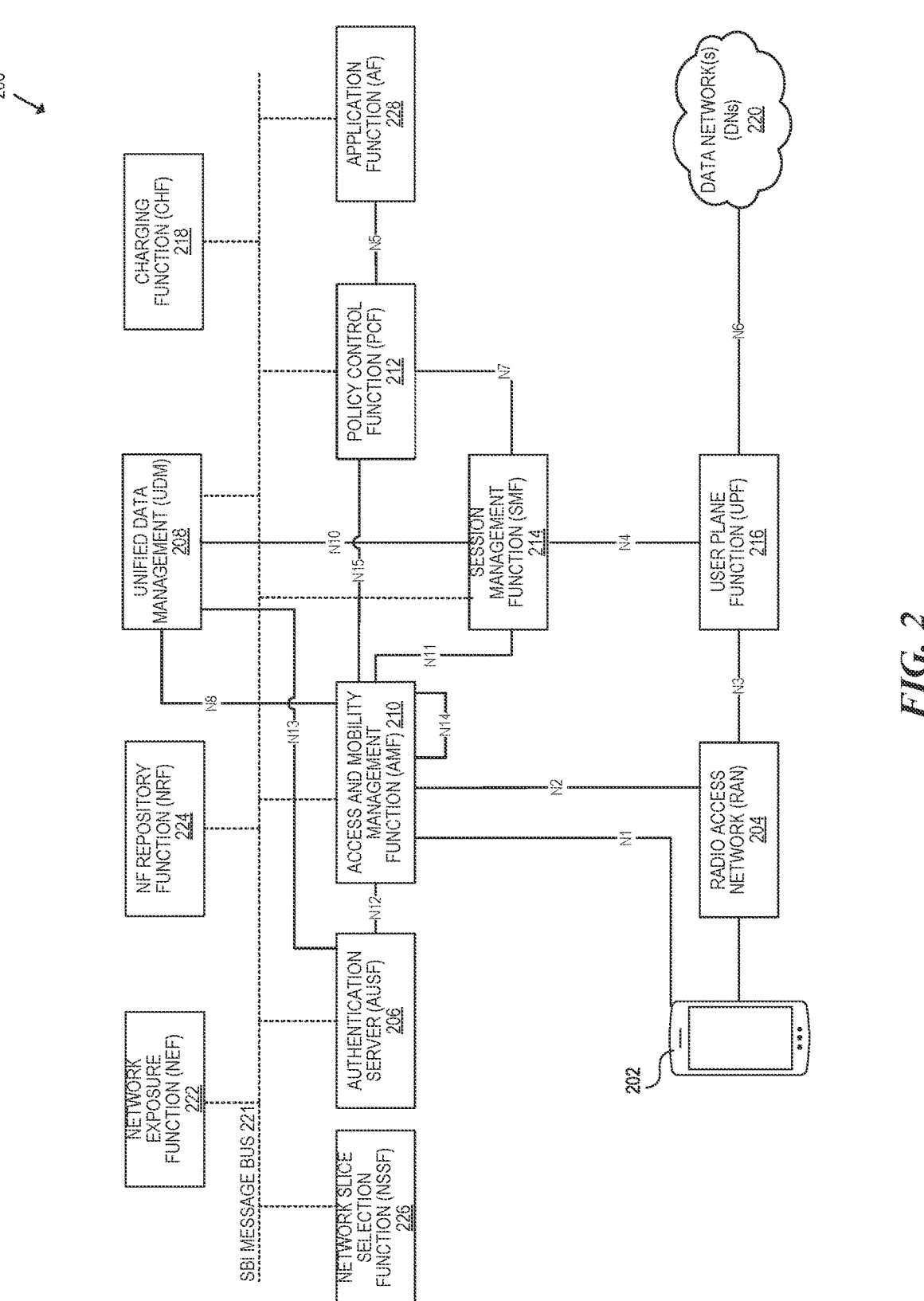
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Allocation of Bandwidth for a Pair of Coupled Bandwidth Resources

FIG. 3 is a block diagram 300 that illustrates the proportion of bandwidth allocated between a pair of coupled bandwidth resources. For example, FIG. 3 illustrates the proportion of bandwidth allocated between uplink bandwidth and downlink bandwidth. The amount of bandwidth allocated between uplink and downlink bandwidth can be adjusted at a predetermined time. For example, the amount the bandwidth is adjusted can be based on a calculated usage trend. In another example, the amount of bandwidth can be allocated by adjusting the TDD slot configuration. A greater number of slots can be configured to either uplink or downlink bandwidth based on the usage trend.

At time A 302, the usage trend can indicate that the wireless device requires a greater amount of downlink bandwidth compared to uplink bandwidth. The system can adjust the allocation of bandwidth to have a greater proportion of the bandwidth for downlink bandwidth by allocating a lower proportion of bandwidth for uplink bandwidth. For example, time A 302 can occur in the morning when to begin operating a wireless device, such as a lathe or milling machine, a large number of instructions need to be downloaded from the network. The downlink bandwidth can be prioritized over the uplink bandwidth due to the wireless device requesting a greater amount of information to be received from the network compared to the amount of information the wireless device is uploading to the network.

At time B 304, the usage trend can indicate that the wireless device requires an equal amount of uplink and downlink bandwidth. The system can adjust the allocation of bandwidth to have an equal amount of uplink and downlink bandwidth. For example, time B 304 can occur in the middle of the day when there is not a greater demand for either uplink or downlink bandwidth compared to the other. Neither uplink nor downlink is prioritized over the other.

At time C 306, the usage trend can indicate that the wireless device requires a greater amount of uplink bandwidth compared to downlink bandwidth. The system can adjust the allocation of bandwidth to have a greater proportion of bandwidth for uplink bandwidth by allocating a lower proportion of bandwidth for downlink bandwidth. For example, time C can occur in the evening when to end operating the wireless device, such as a lathe or milling machine, a large number of log files needs to be uploaded to the network. The uplink bandwidth can be prioritized over the downlink bandwidth due to the wireless device requesting a greater amount of information to be uploaded to the network compared to the amount of information being requested to be received from the network.

Figure 4:
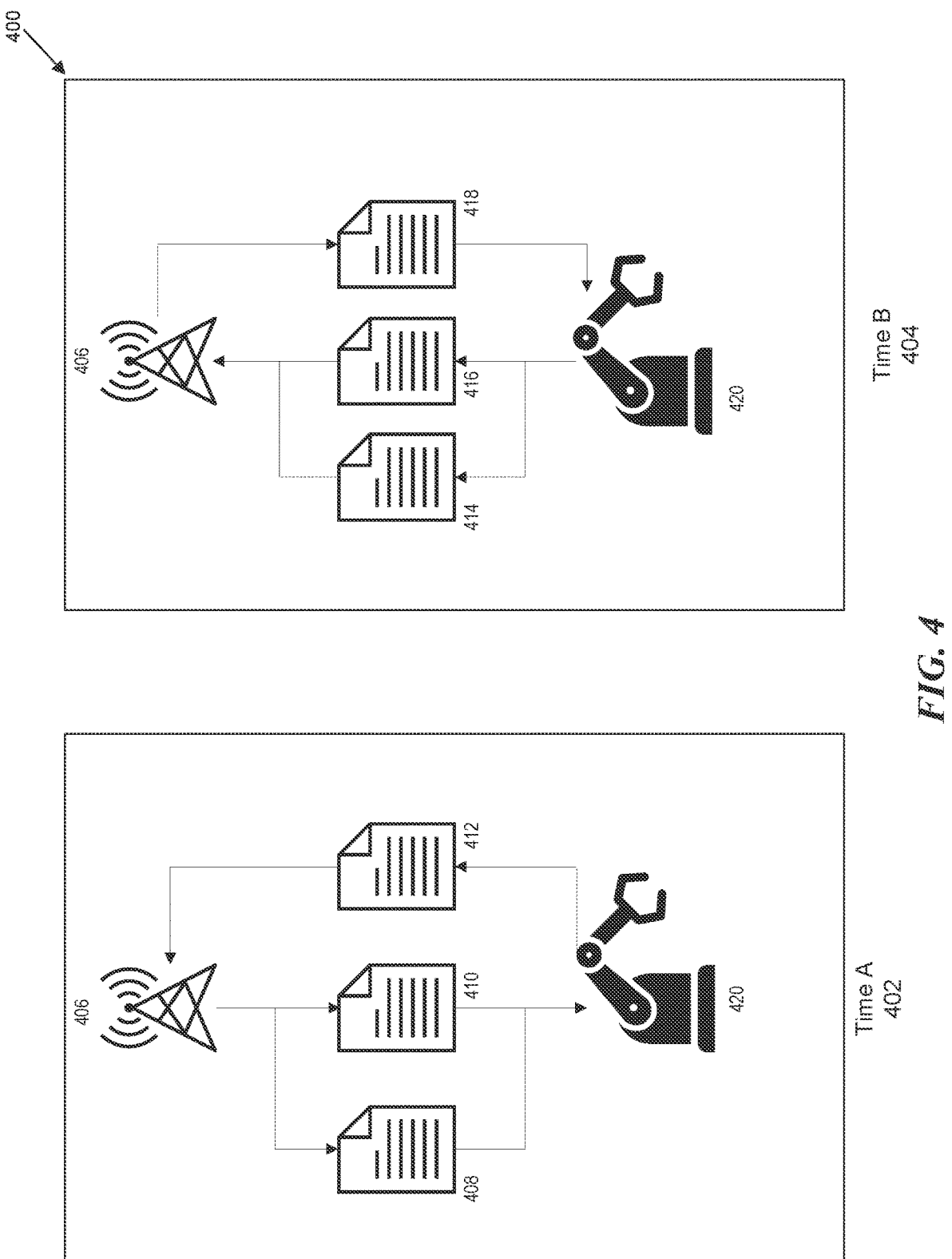
FIG. 4 is a block diagram that illustrates a use case of when a bandwidth resource is prioritized or deprioritized at different times of the day.

FIG. 4 is a block diagram that illustrates a use case of when a bandwidth resource is prioritized or deprioritized at different times of the day. For example, FIG. 4 illustrates a manufacturing facility that utilizes different amounts of a pair of coupled bandwidth resources, such as uplink and downlink bandwidth.

Time A 402 can occur at a time in the morning when the manufacturing process begins for the day or when a new manufacturing shift begins. At time A 402, machine 420 (e.g., a milling machine, 3 Dimensional (3D) printer, a Computer Numerical Control (CNC) machine, or any industrial machine that requires instructions to operate) can require a set of instructions to begin operating. Machine 420 can connect to the network 406. At time A 402, machine 420 can require more downlink bandwidth in order to download instructions 408 and work order 410. Machine 420 can require less uplink bandwidth due to only needing to upload a small amount of log files 412 to the network. Due to the increased requirement in downlink bandwidth, more bandwidth can be allocated to downlink bandwidth by allocating less bandwidth to uplink bandwidth.

Time B 404 can occur in the evening when the manufacturing process ends for the day or at the end of a manufacturing shift. At time B 404, machine 420 can require more uplink bandwidth to upload a set of operating log files 414 and a set of occurred errors 416 to network 406. A lesser amount of downlink bandwidth can be required at time B 404 due to machine 420 only needing to download instructions 418, which relates to shutting down machine 420 or preparing machine 420 for the next shift. Due to the increased requirement for uplink bandwidth, more bandwidth can be allocated to uplink bandwidth by allocating less bandwidth to downlink bandwidth.

FIG. 5 is a table 500 displaying the asymmetric uplink and downlink bandwidth combinations for FDD. Table 500 illustrates 3GPP-approved asymmetric bandwidths. For example, the table 500 can be considered the standard for the telecommunications industry. The table 500 can be updated periodically. The channel bandwidth can be asymmetric in downlink and uplink. In asymmetric channel bandwidth operation, the narrower carrier shall be confined within the frequency range of the wider channel bandwidth. For example, bandwidth for uplink can be 5 or 10 MHz and the bandwidth for downlink can be 20 or 40 MHz for the n66 NR band. Additionally, the bandwidth for uplink can be 20 MHz and the bandwidth for downlink can be 40 MHz for the n66 NR band. In another example, the bandwidth for uplink can be 5 MHz and the bandwidth for downlink can be 10 or 15 MHz for the n70 band. Additionally, the bandwidth for uplink can be 5, 10, or 15 MHz and the bandwidth for downlink can be 20 or 25 MHz for the n70 band.

FIG. 6 is a flowchart that illustrates a process 600 for dynamically adjusting the allocation of bandwidth between a pair of coupled bandwidth resources. The process can be performed by a system of a telecommunications network. In one example, the system includes at least one hardware processor and at least one non-transitory memory storing instructions, which, when executed by the at least one hardware processor, cause the system to perform process 600.

At 602, the system can establish a connection to a wireless device on a cellular network.

At 604, the system can allocate bandwidth between a pair of coupled bandwidth resources for the wireless device. In one example, the pair of coupled bandwidth resources contains a first bandwidth resource and a second bandwidth resource. The first bandwidth resource is allocated relative to the second bandwidth resource. The second bandwidth resource is allocated relative to the first bandwidth resource. There is a fixed amount of bandwidth allocated to the pair of coupled bandwidth resources for the wireless device. In another example, the pair of coupled bandwidth resources includes uplink bandwidth and downlink bandwidth or 5g bandwidth and long-term evolution (LTE) bandwidth.

In one example, the pair of coupled bandwidth resources are allocated by time division duplexing (TDD). The system can allocate a number of TDD slots between the pair of coupled bandwidth resources for the wireless device. The number of TDD slots corresponds to the allocation of bandwidth for the pair of coupled bandwidth resources for the wireless device. There is a fixed number of TDD slots allocated to the pair of coupled bandwidth resources for the wireless device. The number of TDD slots allocated to the first bandwidth resource is inversely related to the number of TDD slots allocated to the second bandwidth resource. The system can adjust the number of TDD slots allocated to the first bandwidth resource based on the usage trend. The first bandwidth resource is prioritized over the second bandwidth resource by inversely adjusting the number of TDD slots allocated to the second bandwidth resource based on the number of TDD slots the first bandwidth resource is adjusted. The system can adjust the number of TDD slots allocated to the second bandwidth resource based on the usage trend. The second bandwidth resource is prioritized over the first bandwidth resource by inversely adjusting the number of TDD slots allocated to the first bandwidth resource based on the number of TDD slots the second bandwidth resource is adjusted.

In another example, the wireless device has a fixed location in the geographic area. The system can allocate a threshold bandwidth between the pair of coupled bandwidth resources for the wireless device. The threshold bandwidth is the amount of bandwidth capable of being transmitted to the wireless device. The system can prioritize the allocation of the threshold bandwidth between the pair of coupled bandwidth resources for the wireless device over the allocation of bandwidth between the pair of coupled bandwidth resources for a second wireless device. Allocating the threshold bandwidth to the wireless device reduces an available amount of bandwidth for the pair of coupled bandwidth resources for the second wireless device.

At 606, the system can determine, based on usage of at least the wireless device and at least one key performance indicator (KPI) of a set of wireless devices, cellular network usage for a geographic area. In one example, the KPI includes block error codes, RACH failures, active number of radio resource control contentions, or LTE and 5G usage.

At 608, the system can calculate a usage trend over a predetermined time period based on the cellular network usage. In one example, the time period includes an hourly, daily, weekly, or monthly time period.

At 610, the system based on the calculated usage trend can adjust the allocation of bandwidth of the first bandwidth resource for the wireless device. In one example, the first bandwidth resource is prioritized over the second bandwidth resource by reducing an amount of bandwidth allocated to the second bandwidth resource and proportionally increasing an amount of bandwidth allocated to the first bandwidth resource. In one example, updating the usage trend can cause the system to determine a change to the cellular network usage of the geographic area caused by the update to the usage of the wireless device and the at least one KPI. The system can update the usage trend based on the change to the cellular network usage, where the update to the usage trend occurs after the predetermined time period.

At 612, the system can readjust the allocation of bandwidth of the first bandwidth resource for the wireless device based on an update to the usage trend. In one example, the first bandwidth resource is deprioritized over the second bandwidth resource by increasing the amount of bandwidth allocated to the second bandwidth resource and proportionally reducing the amount of bandwidth allocated to the first bandwidth resource.

Computer System

Figure 7:
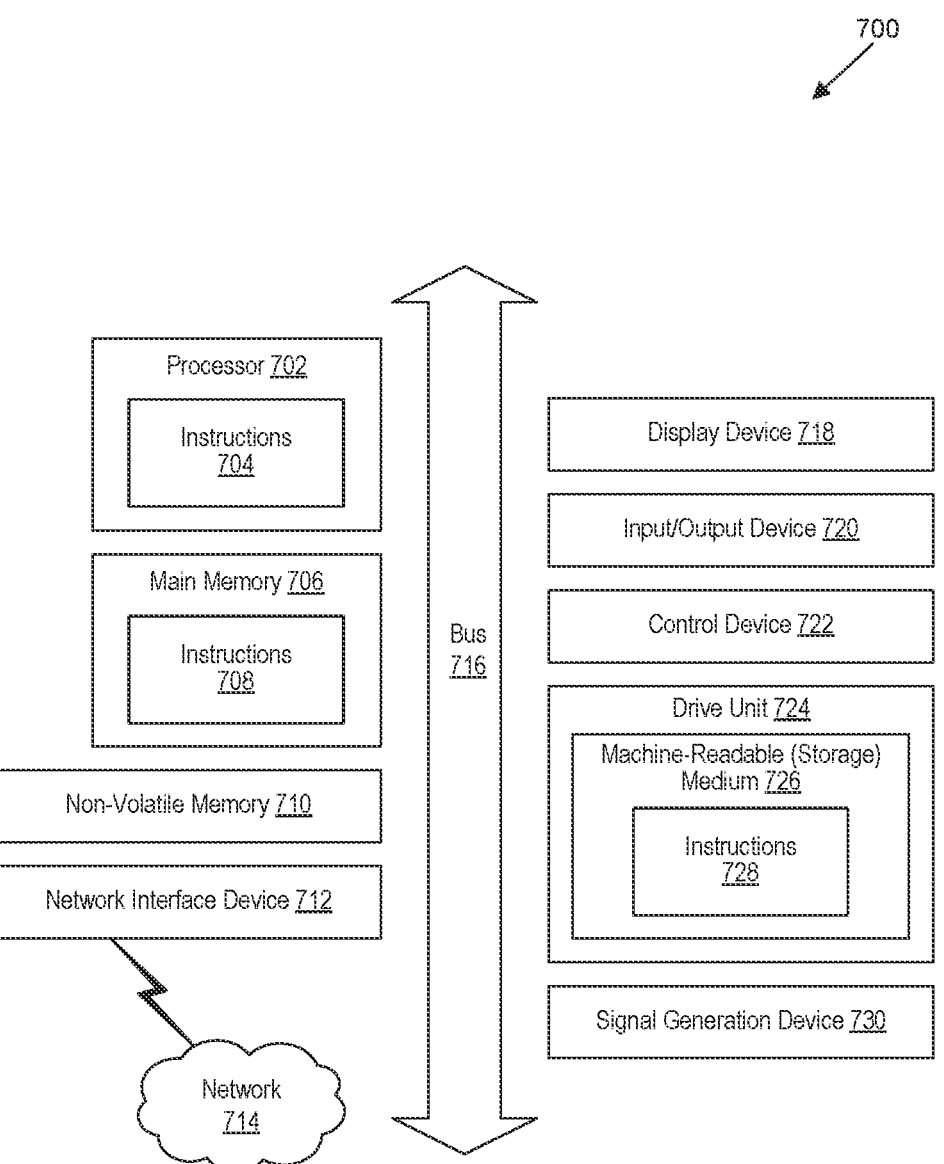
FIG. 7 is a block diagram that illustrates components of a computing device.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

establish a connection to a wireless device on a cellular network;

allocate bandwidth between a pair of coupled bandwidth resources for the wireless device, wherein the pair of coupled bandwidth resources contains a first bandwidth resource and a second bandwidth resource, wherein the first bandwidth resource is allocated relative to the second bandwidth resource, wherein the second bandwidth resource is allocated relative to the first bandwidth resource, and wherein there is a fixed amount of bandwidth allocated to the pair of coupled bandwidth resources for the wireless device;

determine, based on usage of at least the wireless device and at least one key performance indicator (KPI) of a set of wireless devices, cellular network usage for a geographic area;

calculate a usage trend over a predetermined time period based on the cellular network usage; and based on the calculated usage trend:

adjust the allocation of bandwidth of the first bandwidth resource for the wireless device, wherein the first bandwidth resource is prioritized over the second bandwidth resource by reducing an amount of bandwidth allocated to the second bandwidth resource and proportionally increasing an amount of bandwidth allocated to the first bandwidth resource; and readjust the allocation of bandwidth of the first bandwidth resource for the wireless device based on an update to the usage trend, wherein the first bandwidth resource is deprioritized over the second bandwidth resource by increasing the amount of bandwidth allocated to the second bandwidth resource and proportionally reducing the amount of bandwidth allocated to the first bandwidth resource.

2. The non-transitory, computer-readable storage medium of claim 1, wherein the time period includes an hourly, daily, weekly, or monthly time period.

3. The non-transitory, computer-readable storage medium of claim 1, wherein the pair of coupled bandwidth resources includes:

uplink bandwidth and downlink bandwidth, or 5G bandwidth and long-term evolution (LTE) bandwidth.

4. The non-transitory, computer-readable storage medium of claim 1, wherein updating the usage trend further causes the system to:

determine a change to the cellular network usage of the geographic area caused by the update to the usage of the wireless device and the at least one KPI; and update the usage trend based on the change to the cellular network usage, wherein the update to the usage trend occurs after the predetermined time period.

5. The non-transitory, computer-readable storage medium of claim 1, wherein the KPI includes:

block error codes, random access channel (RACH) failures, active number of radio resource control contentions, or LTE and 5G usage.

6. The non-transitory, computer-readable storage medium of claim 1, wherein the pair of coupled bandwidth resources are allocated by time division duplexing (TDD), further causes the system to:

allocate a number of TDD slots between the pair of coupled bandwidth resources for a tracking area, wherein the tracking area is a location in range of a next-generation node b (gNB), wherein the number of TDD slots corresponds to the allocation of bandwidth for the pair of coupled bandwidth resources for the wireless device, wherein there is a fixed number of TDD slots allocated to the pair of coupled bandwidth resources for the wireless device, and wherein the number of TDD slots allocated to the first bandwidth resource is inversely related to the number of TDD slots allocated to the second bandwidth resource;

adjust the number of TDD slots allocated to the first bandwidth resource based on the usage trend, wherein the first bandwidth resource is prioritized over the second bandwidth resource by inversely adjusting the number of TDD slots allocated to the second bandwidth resource based on the number of TDD slots the first bandwidth resource is adjusted; and adjust the number of TDD slots allocated to the second bandwidth resource based on the usage trend, wherein the second bandwidth resource is prioritized over the first bandwidth resource by inversely adjusting the number of TDD slots allocated to the first bandwidth resource based on the number of TDD slots the second bandwidth resource is adjusted.

7. The non-transitory, computer-readable storage medium of claim 1, wherein the wireless device has a fixed location in the geographic area, further causes the system to:

allocate a threshold bandwidth between the pair of coupled bandwidth resources for the wireless device, wherein the threshold bandwidth is the amount of bandwidth capable of being transmitted to the wireless device; and prioritize the allocation of the threshold bandwidth between the pair of coupled bandwidth resources for the wireless device over the allocation of bandwidth between the pair of coupled bandwidth resources for a second wireless device, wherein allocating the threshold bandwidth to the wireless device reduces an available amount of bandwidth for the pair of coupled bandwidth resources for the second wireless device.

8. A system comprising:

at least one hardware processor; and at least one non-transitory memory storing instructions, which, when executed by the at least one hardware processor, cause the system to:

establish a connection to a wireless device on a cellular network;

allocate bandwidth between a pair of coupled bandwidth resources for the wireless device, wherein the pair of coupled bandwidth resources contains a first bandwidth resource and a second bandwidth resource, wherein the first bandwidth resource is allocated relative to the second bandwidth resource, and wherein there is a fixed amount of bandwidth allocated to the pair of coupled bandwidth resources for the wireless device;

determine, based on usage of at least the wireless device and at least one key performance indicator (KPI) of a set of wireless devices, cellular network usage for a geographic area;

calculate a usage trend over a predetermined time period based on the cellular network usage; and based on the calculated usage trend:

adjust the allocation of bandwidth of the first bandwidth resource for the wireless device based on the usage trend, wherein the first bandwidth resource is prioritized over the second bandwidth resource by reducing an amount of bandwidth allocated to the second bandwidth resource and proportionally increasing an amount of bandwidth allocated to the first bandwidth resource; and readjust the allocation of bandwidth of the first bandwidth resource for the wireless device based on an update to the usage trend, wherein the first bandwidth resource is deprioritized over the second bandwidth resource by increasing the amount of bandwidth allocated to the second bandwidth resource and proportionally reducing the amount of bandwidth allocated to the first bandwidth resource.

9. The system of claim 8, wherein the time period includes an hourly, daily, weekly, or monthly time period.

10. The system of claim 8, wherein the pair of coupled bandwidth resources includes:

uplink bandwidth and downlink bandwidth, or 5G bandwidth and long-term evolution (LTE) bandwidth.

11. The system of claim 8, wherein the KPI includes:

block error codes, random access channel (RACH) failures, active number of radio resource control contentions, dropped call rate (DCR), physical downlink shared channel (PDSCH) throughput, physical uplink shared channel (PUSCH) throughput, uplink modulation and coding scheme (MCS), downlink MCS, average channel quality information (CQI), or LTE and 5G usage.

12. The system of claim 8, wherein the pair of coupled bandwidth resources are allocated by time division duplexing (TDD), further causes the system to:

allocate a number of TDD slots between the pair of coupled bandwidth resources for a tracking area, wherein the tracking area is a location in range of a next-generation node b (gNB), wherein the number of TDD slots corresponds to the allocation of bandwidth for the pair of coupled bandwidth resources for the wireless device, wherein there is a fixed number of TDD slots allocated to the pair of coupled bandwidth resources for the wireless device, and wherein the number of TDD slots allocated to the first bandwidth resource is inversely related to the number of TDD slots allocated to the second bandwidth resource;

adjust the number of TDD slots allocated to the first bandwidth resource based on the usage trend, wherein the first bandwidth resource is prioritized over the second bandwidth resource by inversely adjusting the number of TDD slots allocated to the second bandwidth resource based on the number of TDD slots the first bandwidth resource is adjusted; and adjust the number of TDD slots allocated to the second bandwidth resource based on the usage trend, wherein the second bandwidth resource is prioritized over the first bandwidth resource by inversely adjusting the number of TDD slots allocated to the first bandwidth resource based on the number of TDD slots the second bandwidth resource is adjusted.

13. The system of claim 8, wherein the wireless device has a fixed location in the geographic area, further causes the system to:

allocate a threshold bandwidth between the pair of coupled bandwidth resources for the wireless device, wherein the threshold bandwidth is the amount of bandwidth capable of being transmitted to the wireless device; and prioritize the allocation of the threshold bandwidth between the pair of coupled bandwidth resources for the wireless device over the allocation of bandwidth between the pair of coupled bandwidth resources for a second wireless device, wherein allocating the threshold bandwidth to the wireless device reduces an available amount of bandwidth for the pair of coupled bandwidth resources for the second wireless device.

14. A method comprising:

establishing a connection to a wireless device on a cellular network;

allocating bandwidth between a pair of coupled bandwidth resources for the wireless device, wherein the pair of coupled bandwidth resources contains a first bandwidth resource and a second bandwidth resource, wherein the first bandwidth resource is allocated relative to the second bandwidth resource, wherein the second bandwidth resource is allocated relative to the first bandwidth resource, and wherein there is a fixed amount of bandwidth allocated to the pair of coupled bandwidth resources for the wireless device;

determining, based on usage of at least the wireless device and at least one key performance indicator (KPI) of a set of wireless devices, cellular network usage for a geographic area;

calculating a usage trend over a predetermined time period based on the cellular network usage; and based on the calculated usage trend:

adjusting the allocation of bandwidth of the first bandwidth resource for the wireless device based on the usage trend, wherein the first bandwidth resource is prioritized over the second bandwidth resource by reducing an amount of bandwidth allocated to the second bandwidth resource and proportionally increasing an amount of bandwidth allocated to the first bandwidth resource; and readjusting the allocation of bandwidth of the first bandwidth resource for the wireless device based on an update to the usage trend, wherein the first bandwidth resource is deprioritized over the second bandwidth resource by increasing the amount of bandwidth allocated to the second bandwidth resource and proportionally reducing the amount of bandwidth allocated to the first bandwidth resource.

15. The method of claim 14, wherein the time period includes an hourly, daily, weekly, or monthly time period.

16. The method of claim 14, wherein the pair of coupled bandwidth resources includes:

uplink bandwidth and downlink bandwidth, or 5G bandwidth and long-term evolution (LTE) bandwidth.

17. The method of claim 14, wherein updating the usage trend further comprises:

determining a change to the cellular network usage of the geographic area caused by the update to the usage of the wireless device and the at least one KPI; and updating the usage trend based on the change to the cellular network usage, wherein the update to the usage trend occurs after the predetermined time period.

18. The method of claim 14, wherein the KPI includes:

block error codes, random access channel (RACH) failures, active number of radio resource control contentions, or LTE and 5G usage.

19. The method of claim 14, wherein the pair of coupled bandwidth resources are allocated by time division duplexing (TDD), further comprising:

allocating a number of TDD slots between the pair of coupled bandwidth resources for a tracking area, wherein the tracking area is a location in range of a next-generation node b (gNB), wherein the number of TDD slots corresponds to the allocation of bandwidth for the pair of coupled bandwidth resources for the wireless device, wherein there is a fixed number of TDD slots allocated to the pair of coupled bandwidth resources for the wireless device, and wherein the number of TDD slots allocated to the first bandwidth resource is inversely related to the number of TDD slots allocated to the second bandwidth resource;

adjusting the number of TDD slots allocated to the first bandwidth resource based on the usage trend, wherein the first bandwidth resource is prioritized over the second bandwidth resource by inversely adjusting the number of TDD slots allocated to the second bandwidth resource based on the number of TDD slots the first bandwidth resource is adjusted; and adjusting the number of TDD slots allocated to the second bandwidth resource based on the usage trend, wherein the second bandwidth resource is prioritized over the first bandwidth resource by inversely adjusting the number of TDD slots allocated to the first bandwidth resource based on the number of TDD slots the second bandwidth resource is adjusted.

20. The method of claim 14, wherein the wireless device has a fixed location in the geographic area, further comprising:

allocating a threshold bandwidth between the pair of coupled bandwidth resources for the wireless device, wherein the threshold bandwidth is the amount of bandwidth capable of being transmitted to the wireless device; and prioritizing the allocation of the threshold bandwidth between the pair of coupled bandwidth resources for the wireless device over the allocation of bandwidth between the pair of coupled bandwidth resources for a second wireless device, wherein allocating the threshold bandwidth to the wireless device reduces an available amount of bandwidth for the pair of coupled bandwidth resources for the second wireless device.

* * * * *